United States Patent
Laik et al.

(10) Patent No.: US 7,617,239 B2
(45) Date of Patent: Nov. 10, 2009

(54) MODELING OF ACTIVITY DATA

(75) Inventors: Pascal Laik, Paris (FR); Ramaswamy Sundararaian, Cupertino, CA (US); Shailendra Garg, Cupertino, CA (US); Roland Pierre Vallet, San Francisco, CA (US); Maria Theresa Barnes Leon, Fremont, CA (US)

(73) Assignee: Siebel Systems, Inc., San Mateo, CA (US)

( * ) Notice: Subject to any disclaimer, the term of this patent is extended or adjusted under 35 U.S.C. 154(b) by 268 days.

(21) Appl. No.: 10/851,312

(22) Filed: May 21, 2004

(65) Prior Publication Data

US 2007/0208768 A1 Sep. 6, 2007

(51) Int. Cl.
G06F 7/00 (2006.01)
(52) U.S. Cl. .................. 707/103 R; 707/101; 707/104.1
(58) Field of Classification Search ............... 705/1, 705/7, 8, 10, 20; 707/1, 7, 100, 103, 101, 707/104.1; 709/201, 226, 230; 715/740; 717/104, 108; 703/1
See application file for complete search history.

(56) References Cited

U.S. PATENT DOCUMENTS

| | | | | |
|---|---|---|---|---|
| 4,953,080 A * | 8/1990 | Dysart et al. | ............ | 707/103 R |
| 5,361,350 A * | 11/1994 | Conner et al. | ............ | 707/103 R |
| 5,819,270 A * | 10/1998 | Malone et al. | ................. | 707/7 |
| 5,963,924 A | 10/1999 | Williams et al. | ............... | 705/40 |
| 6,016,484 A | 1/2000 | Williams et al. | ............... | 705/39 |
| 6,088,717 A * | 7/2000 | Reed et al. | ................. | 709/201 |
| 6,125,391 A | 9/2000 | Meltzer et al. | ............... | 709/223 |
| 6,154,738 A | 11/2000 | Call | ............................. | 707/4 |
| 6,225,546 B1 | 5/2001 | Kraft et al. | .................... | 84/609 |
| 6,681,223 B1 | 1/2004 | Sundaresan | .................... | 707/6 |
| 6,728,948 B1 | 4/2004 | Baxter et al. | ................ | 717/108 |
| 6,766,361 B1 | 7/2004 | Venigalla | .................... | 709/217 |
| 6,768,994 B1 | 7/2004 | Howard et al. | ................ | 707/10 |
| 6,873,991 B2 | 3/2005 | Carroll et al | ................ | 707/101 |
| 6,941,298 B2 | 9/2005 | Chow et al. | .................... | 707/3 |
| 6,990,656 B2 | 1/2006 | Ersek et al. | ................ | 717/121 |
| 7,005,970 B2 | 2/2006 | Hodsdon et al. | ............ | 340/323 |
| 7,162,540 B2 | 1/2007 | Jasen et al. | .................. | 709/242 |
| 2001/0042023 A1 | 11/2001 | Anderson et al. | ............ | 705/26 |
| 2002/0055870 A1* | 5/2002 | Thomas | ....................... | 705/10 |
| 2002/0055878 A1 | 5/2002 | Burton et al. | ................. | 705/26 |
| 2002/0059425 A1* | 5/2002 | Belfiore et al. | ............. | 709/226 |
| 2002/0069081 A1* | 6/2002 | Ingram et al. | .................. | 705/1 |
| 2002/0099735 A1 | 7/2002 | Schroeder et al. | ........... | 707/513 |
| 2002/0129059 A1* | 9/2002 | Eck | ............................. | 707/513 |

(Continued)

FOREIGN PATENT DOCUMENTS

WO    WO 02/065360 A2    8/2002

OTHER PUBLICATIONS

Nardo B. Catahan, Jr. et al., "Modeling of Order Data," U.S. Appl. No. 10/703,053, filed Nov. 5, 2003.

(Continued)

*Primary Examiner*—John E Breene
*Assistant Examiner*—Thu-Nguyet Le
(74) *Attorney, Agent, or Firm*—Campbell Stephenson LLP

(57) ABSTRACT

An activity class is defined which includes multiple data elements that are common to various activity types. The activity class identifies relationships of an activity with various entities related to the activity.

23 Claims, 12 Drawing Sheets

U.S. PATENT DOCUMENTS

| | | | | |
|---|---|---|---|---|
| 2002/0143655 | A1 | 10/2002 | Elston et al. | 705/26 |
| 2003/0009437 | A1* | 1/2003 | Seiler et al. | 707/1 |
| 2003/0014617 | A1* | 1/2003 | Tamboli et al. | 713/1 |
| 2003/0018502 | A1 | 1/2003 | Rodriguez | 705/7 |
| 2003/0018832 | A1 | 1/2003 | Amirisetty et al. | 709/328 |
| 2003/0154293 | A1* | 8/2003 | Zmolek | 709/228 |
| 2003/0163603 | A1 | 8/2003 | Fry et al. | 709/328 |
| 2004/0015783 | A1* | 1/2004 | Lennon et al. | 715/523 |
| 2004/0261026 | A1* | 12/2004 | Corson | 715/704 |
| 2005/0144087 | A1* | 6/2005 | Huang et al. | 705/26 |

OTHER PUBLICATIONS

Damian Conway, "The Booch Notation," Jul. 1999, pp. 1-19.
Dr. Jeff Sutherland, "The Object Technology Architecture: Business Objects for Corporate Information Systems," 1997, pp. 1-9.
Blaise Doughan, Introduction to TopLink Object-XML Mapping, pp. 1-4.
PCT Search Report, PCT/U04/04385, date of mailing Oct. 19, 2005, 7 pages.
Gauthier, Pierre, Editor; "OSS Through Java - OSS through Java™ J2EE Design Guidelines," Internet Citation [Online], Oct. 31, 2001, Retrieved from the Internet: URL:http://www.ossj.org/downloads/Design_guidelines.shtml, [retrieved Apr. 20, 2005]; pp. 1-115.; Ref. No. XP3-002325475.
Hohpe, Gregor et al., "Thought-Works, The Art of Heavy Lifting; Test-Driven Development in Enterprise Integration Projects," Nov. 2002, Retrieved from the Internet: URL: http://enterpriseintegrationpatterns. com/docs/TestDriveEAI.pdf, [retrieved on Jan. 13, 2007]; pp. 1-15; Ref. No. XP-007901994.
OSS Through Java TM Initiative - Service Activation API," Version 1.0, Mar. 7, 2002 Final," Internet Citation, [Online], Jul. 3, 2002 (Mar. 7, 2002), Retrieved from the Internet: URL:http://java.sun.com/products/oss/downloads/jsr89_downloads.html, [retrieved on Apr. 23, 2007]; pp. 1-80.

\* cited by examiner

MODELING OF ACTIVITY DATA

FIELD OF THE INVENTION

This invention relates generally to data modeling, and more particularly to modeling of activity data.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2004, Siebel Systems, Inc., All Rights Reserved.

BACKGROUND OF THE INVENTION

Various business entities, such as companies, store information electronically in furtherance of their business needs. These companies may have extensive databases of information that include activity tables, product tables, service request tables, employee tables, and so on. The schemas and data models associated with these databases may be customized to help meet the business needs of the company. For example, an automotive service company may organize information about its activities in a way that is very different from the way that a computer service company may organize information about its activities. Even within a single company, that company may use many different application programs that employ very different schemas and data models. For example, a service request application program may use a data model that is very different from the data model used by a call tracking application program. The use of customized data models by a company and by applications within the company has the advantage that it allows information to be modeled in a way that is appropriate for business needs of the company. Unfortunately, because of this diversity in the data models, it is not easy for the company to share its information with other companies or for applications to share their information.

Various attempts have been made to define standard data models so that information can be more easily shared between companies and applications. However, these data models have not been able to achieve sufficient data integration and simplicity. As a result, companies have to maintain, support and upgrade multiple different data structures and maps for their products.

SUMMARY OF THE INVENTION

The present invention relates to various aspects for modeling activity data.

According to one aspect of the present invention, an activity class is defined which includes multiple data elements that are common to various activity types. The activity class identifies relationships of an activity with various entities related to the activity.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE INVENTION

Figure 1:
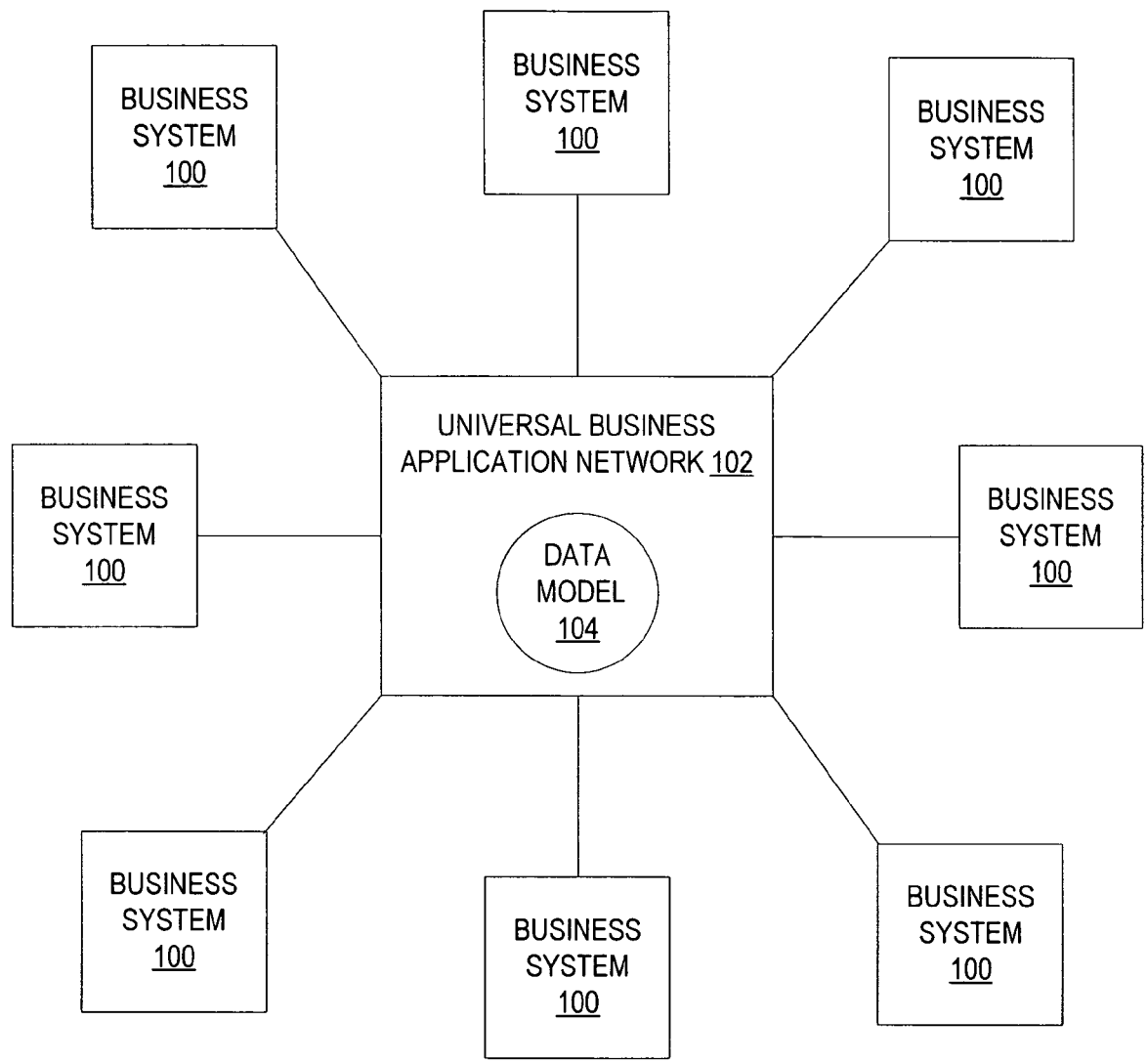
FIG. 1 is a block diagram illustrating the interconnection between various business systems and a universal business application network, according to one embodiment of the present invention.

In the following description, numerous details are set forth. It will be apparent, however, to one skilled in the art, that the present invention may be practiced without these specific details. In some instances, well-known structures and devices are shown in block diagram form, rather than in detail, in activity to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

A data model that provides a common data structure to represent an activity and allows for customization of the data model in a manner that facilitates upgrading of the data model is described. In one embodiment, the data model defines an activity class that includes a set of data elements that is common to various activity types and does not depend on a specific business process to which an activity relates. The various activity types may include, for example, a service request activity (an activity relating to a service request process), an opportunity activity (an activity relating to a business opportunity or a lead), a call tracking activity (an activity relating to a call tracking process), etc.

In one embodiment, the activity class defines relationships of an activity with various entities related to the activity. These entities may include, for example, follow-up actions (follow-up actions resulting from the activity), related accounts (accounts of customers associated with the activity), a related parent activity (an activity that triggered the current activity), related installed products (installed products associated with the activity), a related opportunity (a business opportunity or a lead for which the activity is performed), a related service request (a service request for which the activity is performed), related contacts (external parties related to the activity), related employees (employees related to the activity), etc.

The data model models the relationships as attributes associated with an activity. In one embodiment, the activity data model is specified using a schema language such as XML Schema.

In one embodiment, the data model defines a hierarchy of the data elements for describing an activity. The data model may define data elements that are complex. A complex data element is a data element that comprises data sub-elements. For example, an address data element may be a complex data element that includes street, city, and state data sub-elements. The data model may specify custom data elements at various places within the hierarchy of data elements. A custom data element is of a custom data element type. The custom data element type initially defines no data elements. The data model can be customized by defining custom data elements that are specific to different applications or systems. Because the custom data elements are defined at various places within the hierarchy, the customizations of the data model can be associated with related data elements within the hierarchy.

Accordingly, a common data model representing various activity types allows the companies to maintain, support and upgrade only a single data model and provides for efficient data transformations and mappings. In addition, the existence of custom data elements at various levels of the data model's hierarchy simplifies the customization of the common data model.

FIG. 1 is a block diagram illustrating the interconnection between various business systems 100 (e.g., business systems utilizing activity related data) and a universal business application network 102, according to one embodiment of the present invention. The universal business application network 100 serves as an integration hub for the business systems 100. The architecture of the universal business application network 102 allows new applications (e.g., new applications utilizing activity data) that access legacy business systems to be developed with minimum customization. The legacy business systems can be provided by a single business organization or by different business organizations. The universal business application network 102 allows the activity applications to exchange information using a common activity data model 104.

In one embodiment, the common data model 104 defines a hierarchical data structure representing an activity. This hierarchical data structure includes data elements that are common to all business systems 100. In addition, the hierarchical data structure includes data custom data elements at various levels of the hierarchy to define data fields that are specific to each business system 100, thus providing for easy customization of the common data model 104.

In one embodiment, the universal business application network 102 uses the XML and Web services standards.

Figure 2:
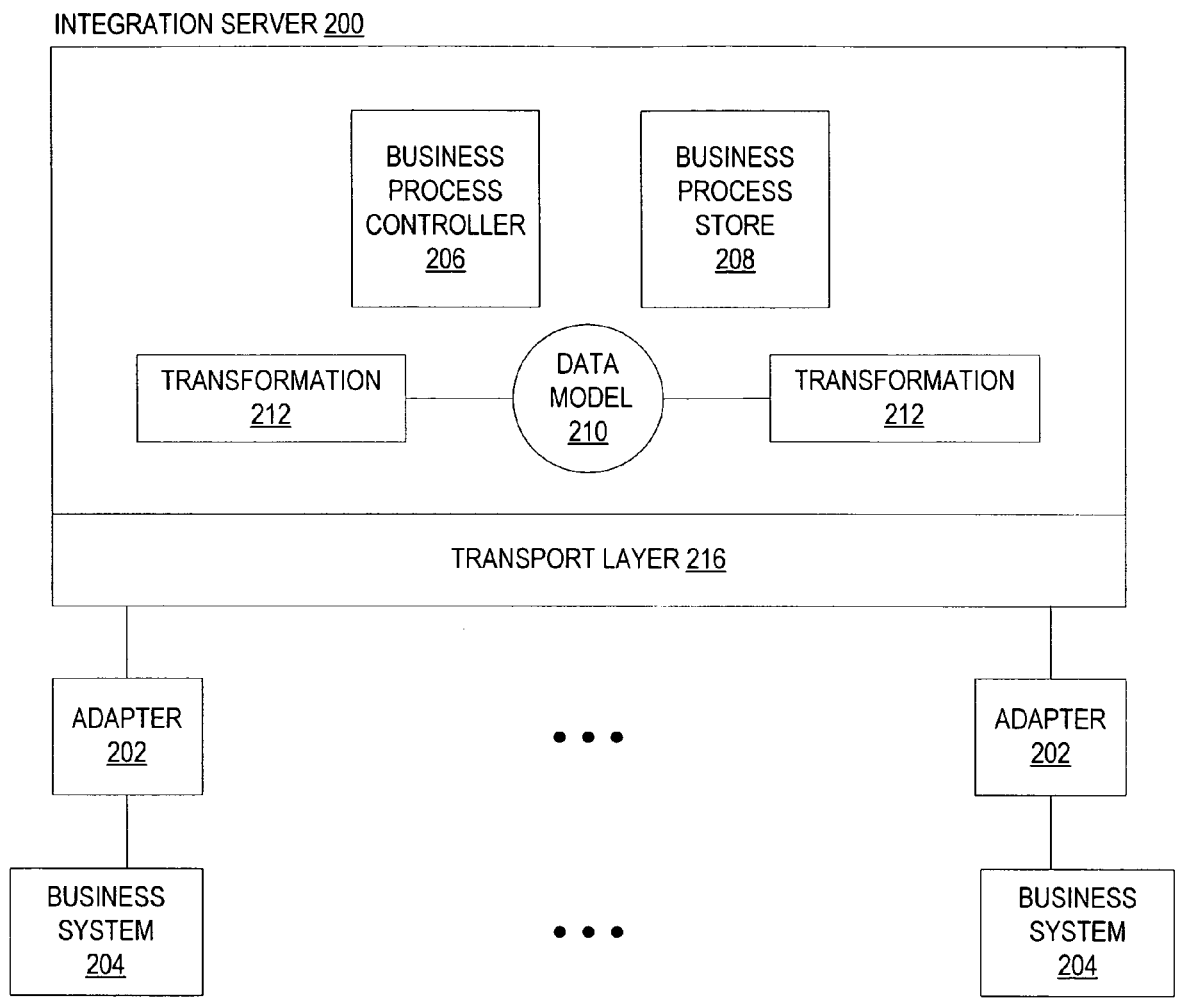
FIG. 2 is a block diagram illustrating the overall architecture of a universal business application network, according to one embodiment of the present invention.

FIG. 2 is a block diagram illustrating the overall architecture of a universal business application network in one embodiment. The hub of the universal business application network is an integration server 200 that connects to the various business systems 204 (e.g., manufacturer systems, supplier systems, wholesaler systems, retailer systems, and other business systems utilizing activity related data) via adapters 202. The integration server 200 includes a transport layer 216, a data model 210, a transformation store 212, a business process controller 206, and a business process store 208.

The transport layer 216 is a mechanism through which business information is exchanged between the business systems 204 and the business integration server 200. Each business system 204 may have an adapter 202 that is appropriate to the protocol of the transport layer. For example, the transport mechanism may use communications protocols such as TCP/IP. The transport layer 216 may provide a messaging service for queuing, for guaranteeing delivery of messages, and for handling both synchronous and asynchronous messaging. The adapters 202 relay events from the business systems 204 to the integration server 200 and can import configurations of the business systems 204 into the integration server 200. In addition, the universal business application network may include encryption and authentication mechanisms to ensure the security and integrity of the information. For example, authentication will help ensure that a business process is accessing the intended business system, rather than an impostor business system.

The integration server 200 stores the representation of a data model 210 (e.g., in an XML schema file) that contains the definition of an activity class.

The transformation store 212 contains a model data definition tool (e.g., an XML schema definition tool) to create a definition of the data model 210 (e.g., in an XML schema file) and to customize the data model 210 when requested by adding custom data fields to the data model 210. The transformation store 212 also contains transformations for transforming information received from the business systems 204 to the format used by the data model 210, and vice versa. For example, an activity class may include a globally unique identifier for each activity. A transformation for a business system that does not use globally unique identifiers may need to access an identification server to determine the globally unique identifier for each activity. The transformations may be specified as a computer program, an XML Stylesheet Language Transform (XSLT), etc.

The business process store 208 contains the business processes that have been defined. A business process may be specified as a script, a process flow, an executable program, etc. In one embodiment, the business processes are defined using the Web Service Flow Language (WSFL). The business processes orchestrate a sequence of steps across multiple applications provided by the business systems 204 to achieve a business objective.

The business process controller 206 coordinates the execution of the business processes. The business process controller 206 may instantiate a class or a sub-class and invoke functions of the resulting objects in accordance with the various business processes. The business process controller 206 may also initiate the execution of business processes based on predefined conditions and events. For example, the business process controller 206 may launch a certain business process each time an alert is received. Although not shown, the business integration network may provide a standard library of business routines that may be invoked by the business processes. For example, a standard business routine may identify whether two activity objects are related via a customer account and create a relationship between the two activity objects if they are related. The integration server 200 may also include various tools to facilitate the development of business processes. These tools may aid in the development of transformations, the defining of classes, and the writing of process flows.

Figure 3:
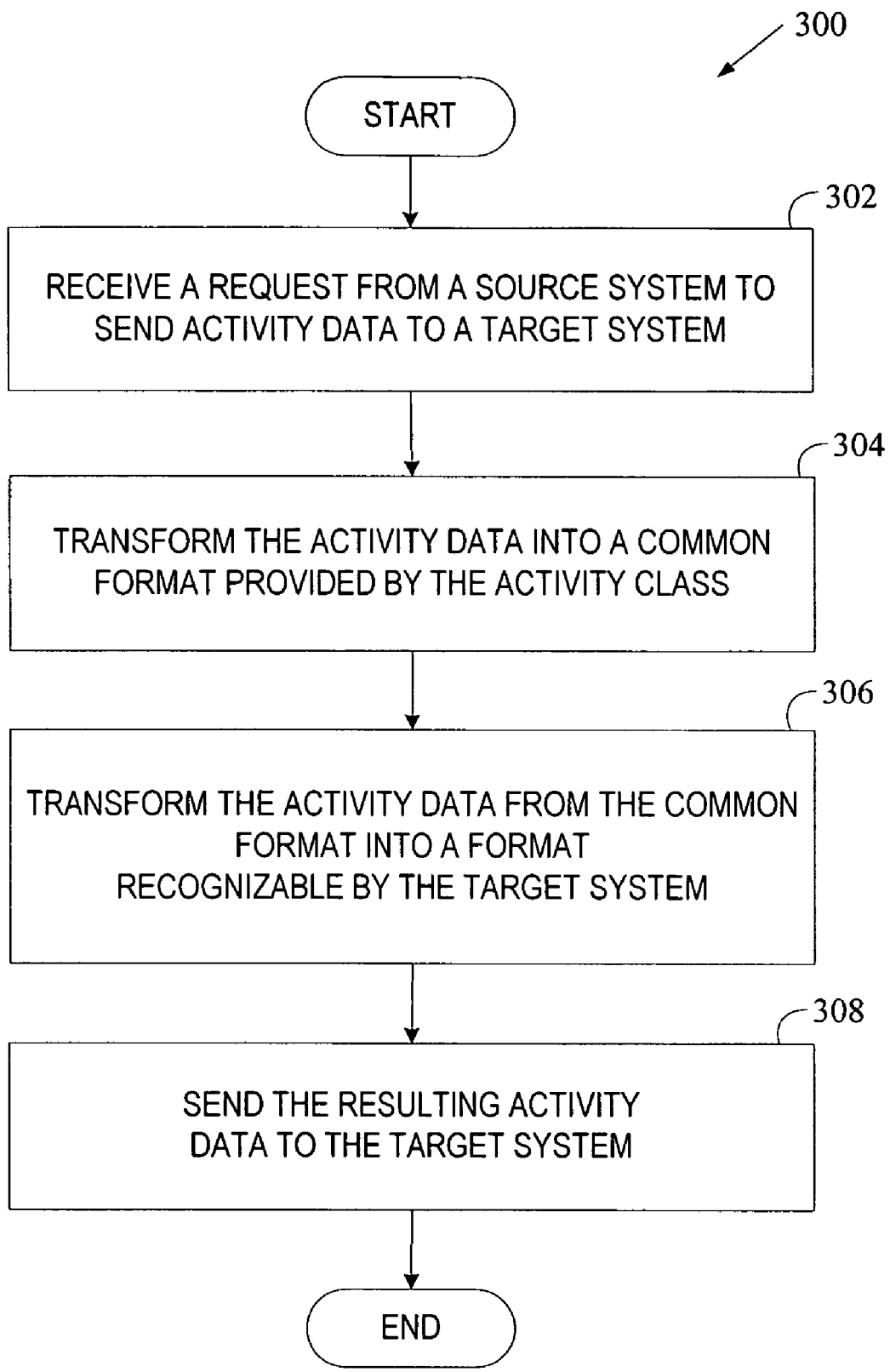
FIG. 3 is a flow diagram of one embodiment of a process for transforming activity data into a common format provided by an activity class.

FIG. 3 is a flow diagram of one embodiment of a process 300 for facilitating the sharing of activity data between two applications utilizing activity data. The process may be performed by processing logic that may comprise hardware (e.g., circuitry, dedicated logic, etc.), software (such as run on a general purpose computer system or a dedicated machine), or a combination of both. Processing logic may reside on an integration server such as the integration server 200 of FIG. 2.

Referring to FIG. 3, process 300 begins with processing logic receiving a request from a source system to send activity data to a target system (processing block 302). For example, the activity data may pertain to a meeting scheduled by a manufacturer to discuss a new business opportunity with the manufacturer's partner (e.g., a reseller), a source system may be a customer relationship management (CRM) or partner relationship management (PRM) application used by the manufacturer, and a target system may be a CRM or PRM application used by the manufacturer's partner. In another example, the activity data may be data associated with replacing an automotive part, a source system may be a service request application used by an automotive service provider, and a target system may be an order application used by an automotive part manufacturer.

At processing block 304, processing logic transforms the activity data into a common format provided by an activity class of the activity data model. The activity class represents activities of different types and defines relationships of an activity with various entities related to the activity. The various activity types may include, for example, a service request activity (an activity relating to a service request process), an opportunity activity (an activity relating to a business opportunity or lead), a call tracking activity (an activity relating to a call tracking process), etc. The entities related to the activity may include, for example, follow-up actions (follow-up actions resulting from the activity), related accounts (accounts of customers associated with the activity), a related parent activity (an activity that triggered the current activity), related installed products (installed products associated with the activity), a related opportunity (a business opportunity or a lead for which the activity is performed), a related service request (a service request for which the activity is performed), related contacts (external parties related to the activity), related employees, etc. In one embodiment, the relationships of the activity object are created during the transformation based on information received from the source system. Alternatively, the relationships may be created by designated business processes (e.g., business processes stored in the business process store 208) after the transformation.

Further, processing logic transforms the activity data from the common format into a format recognizable by the target system (processing block 306) and sends the resulting activity data to the target system (processing block 308).

Thus, according to the process 300, the sharing of activity data between two systems does not require data mapping between the data format of the source application and the data format of the target application. Instead, the mapping is performed between each system and the common data model. Furthermore, the process 300 allows various divisions and/or organizations to share the activity data in a manner that allows access to up-to-date activity information by all participating parties, thus facilitating collaboration between the parties participating in the activity and a business process to which the activity relates.

In one embodiment, each class of the activity data model can be customized for a specific business system or application.

Figure 4:
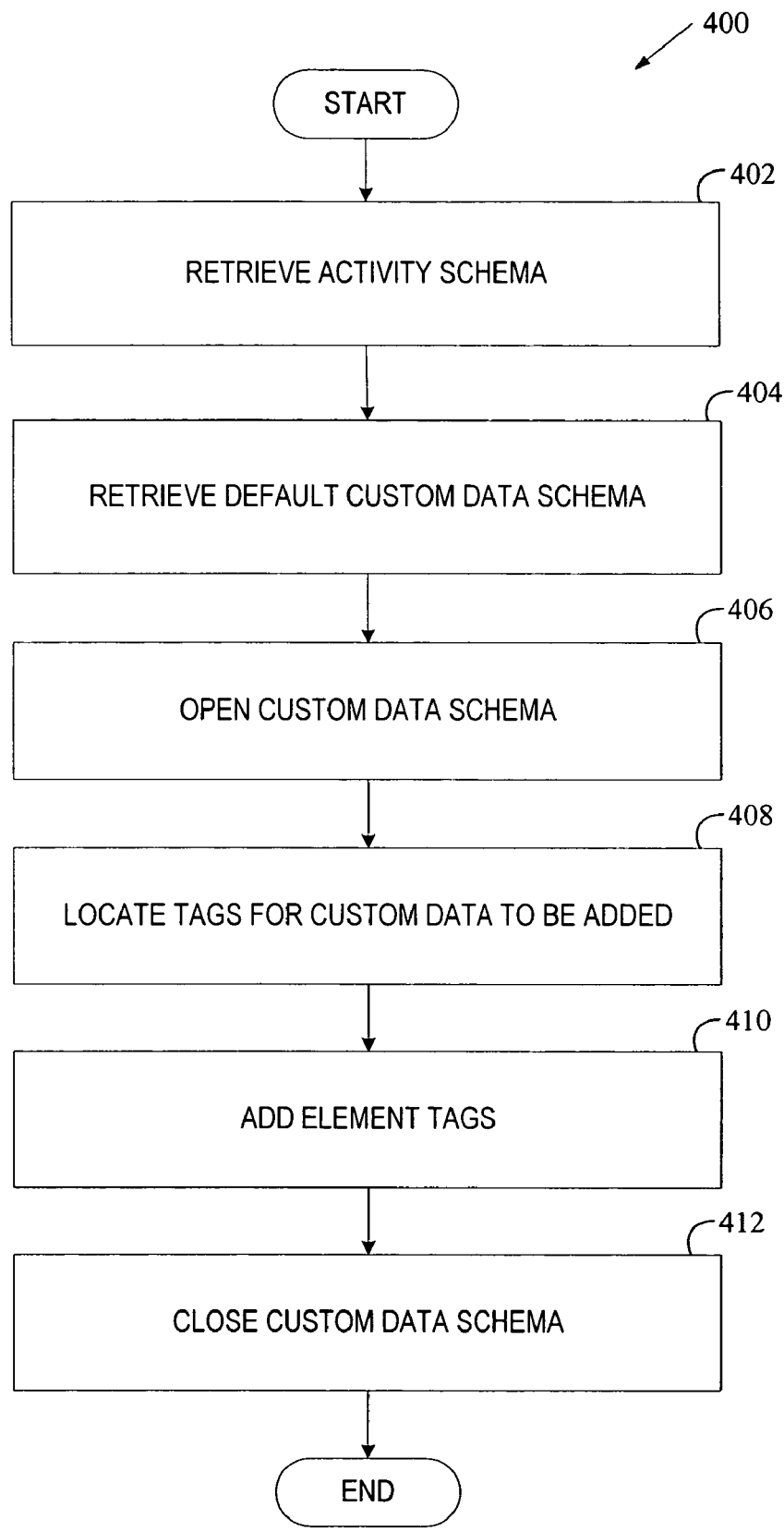
FIG. 4 is a flow diagram of one embodiment of a process for adding custom data to an activity class.

FIG. 4 is a flow diagram of one embodiment of a process for adding custom data to an activity class. The process may be performed by processing logic that may comprise hardware (e.g., circuitry, dedicated logic, etc.), software (such as run on a general purpose computer system or a dedicated machine), or a combination of both. Processing logic may reside on an integration server such as the integration server 200 of FIG. 2.

At processing block 402, processing logic retrieves a data definition schema for the activity class. The schema may be an XML schema file that includes a custom data element of a type that is defined in another file.

At processing block 404, processing logic retrieves the custom data schema for the types of custom data. The schema may be stored in an XML schema file that contains the definition for each type of custom data.

Next, processing logic opens the custom data schema (processing block 406) and locates the tags relating to the custom data type of interest (processing block 408).

Further, processing logic adds the custom data elements to the located tags (processing block 410) and closes the custom data schema with the newly defined data elements (processing block 412).

One embodiment of a common data model representing an activity will now be described in more detail in conjunction with FIGS. 5-20. One skilled in the art will appreciate that various other common data models representing an activity can be used with the present invention without loss of generality. In addition, the names of data elements illustrated in FIGS. 5-20 are descriptive of the information stored in the data elements.

Figure 5:
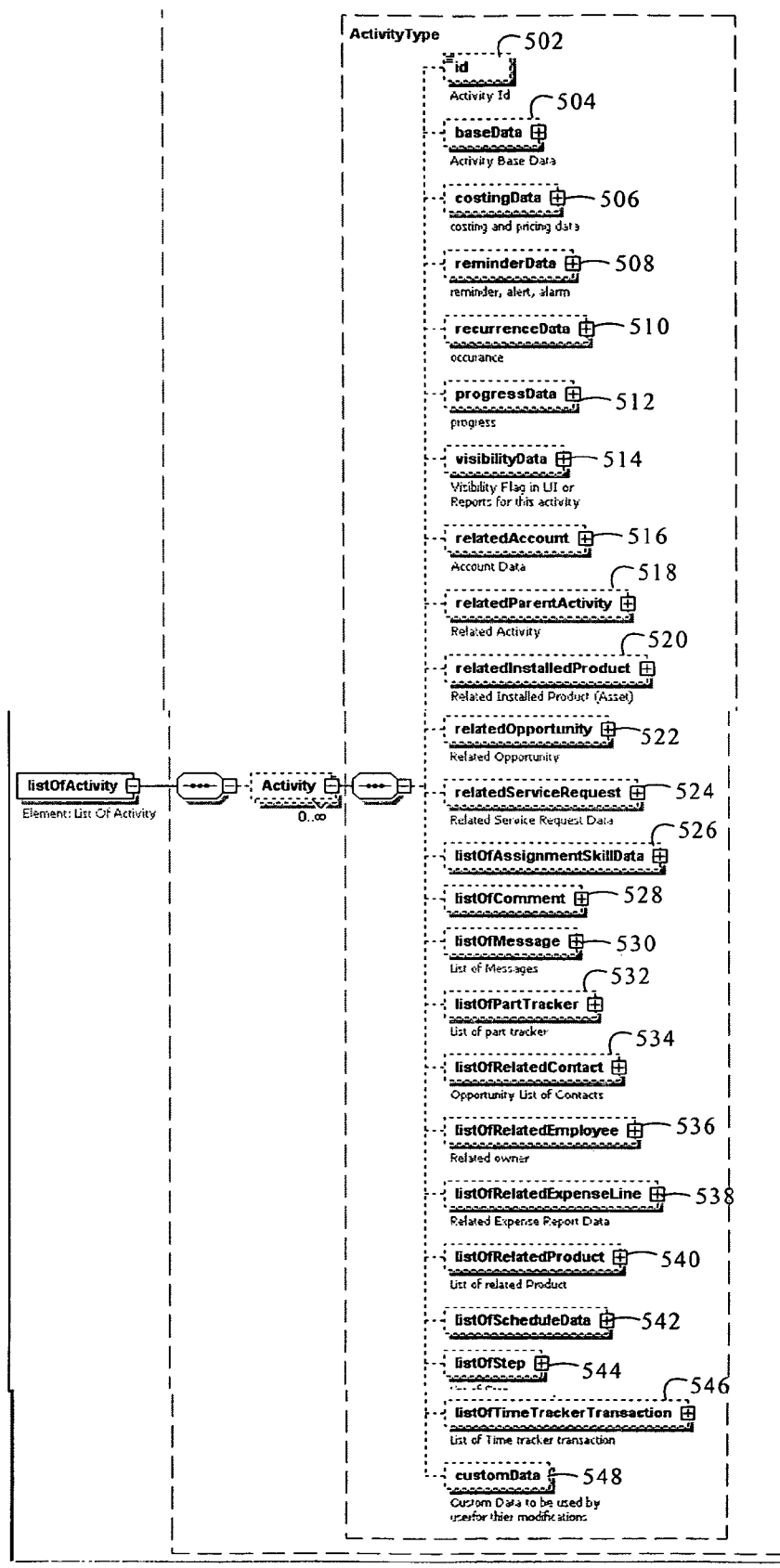
FIGS. 5-20 illustrate one embodiment of a common data model representing an activity.

FIG. 5 illustrates the highest level data elements of the activity type in one embodiment. The highest level data elements include id 502, baseData 504, costingData 506, reminderData 508, recurrenceData 510, progressData 512, visibilityData 514, relatedAccount 516, relatedParentActivity 518, relatedInstalledProduct 520, relatedOpportunity 522, relatedServiceRequest 524, listOfAssignmentSkillData 526, listOfComment 528, listOfMessage 530, listOfPartTracker 532, listOfRelatedContact 534, listOfRelatedEmployee 536, listOfRelatedExpenseLine 538, listOfRelatedProduct 540, listOfScheduleData 542, listOfStep 544, listOfTimeTrackerTransaction 546, and customData 548.

The id data element 502 may be a unique identifier of an activity. The baseData data element 504 contains general information about the activity, as will be discussed in more detail below in conjunction with FIG. 6. The costingData data element 506 contains information on how much the cost of the activity is expected to be, as will be discussed in more detail below in conjunction with FIG. 7.

The reminderData data element 508 contains information on follow-up actions resulting from the current activity, as will be discussed in more detail below in conjunction with FIG. 8.

The recurrenceData data element 510 contains information on the frequency of the activity, as will be discussed in more detail below in conjunction with FIG. 9.

The progressData data element 512 contains information about the current progress of the activity (e.g., percent completed), as will be discussed in more detail below in conjunction with FIG. 10.

The visibilityData data element 514 contains information on a level of user access to the activity data, as will be discussed in more detail below in conjunction with FIG. 11.

The relatedAccount data element 516 contains information on the account of a customer associated with the activity. The relatedAccount data element 516 references to a party class representing a party (the relatedAccount data element 516 specifies a party type (e.g., an organization type) for the party class).

The relatedParentActivity data element 518 contains information on a parent activity that triggered the current activity.

The relatedInstalledProduct data element 520 contains information on an installed product associated with the activity.

The relatedOpportunity data element 522 contains information on a business opportunity or lead, for which the activity needs to be performed. The relatedOpportunity data element 522 references to an opportunity class representing an opportunity.

The relatedServiceRequest data element 524 contains information on a service request for which the activity needs to be performed. The relatedServiceRequest data element 524 references to a service request class representing a service request.

The listOfAssignmentSkillData data element 526 contains information on the skill of a person to whom the activity is assigned, as will be discussed in more detail below in conjunction with FIG. 12.

The listOfComment data element 528 contains a list of comments associated with the activity.

The listOfMessage data element 530 contains information on messages associated with the activity, as will be discussed in more detail below in conjunction with FIG. 14.

The listOfPartTracker data element 532 contains information on various inventory movements associated with the activity, as will be discussed in more detail below in conjunction with FIG. 15.

The listOfRelatedContact data element 534 contains information on contacts associated with the activity, as will be discussed in more detail below in conjunction with FIG. 16.

The listOfRelatedEmployee data element 536 contains information on employees associated with the activity, as will be discussed in more detail below in conjunction with FIG. 17.

The listOfRelatedExpenseLine data element 538 contains information on expenses associated with the activity, as will be discussed in more detail below in conjunction with FIG. 18.

The listOfRelatedProduct data element 540 contains information on products related to the activity. The listOfRelatedProduct data element 540 references to a product class representing a product.

The listOfScheduleData data element 542 contains scheduling information associated with the activity.

The listOfStep data element 544 contains information on steps for fulfilling the activity, as will be discussed in more detail below in conjunction with FIG. 19.

The listOfTimeTrackerTransaction data element 546 contains information on the time taken for the activity, as will be discussed in more detail below in conjunction with FIG. 20.

The customData data element 548 initially contains no data elements, but custom data elements can be added by defining data elements in the ActivityCustomDataType.

Figure 6:
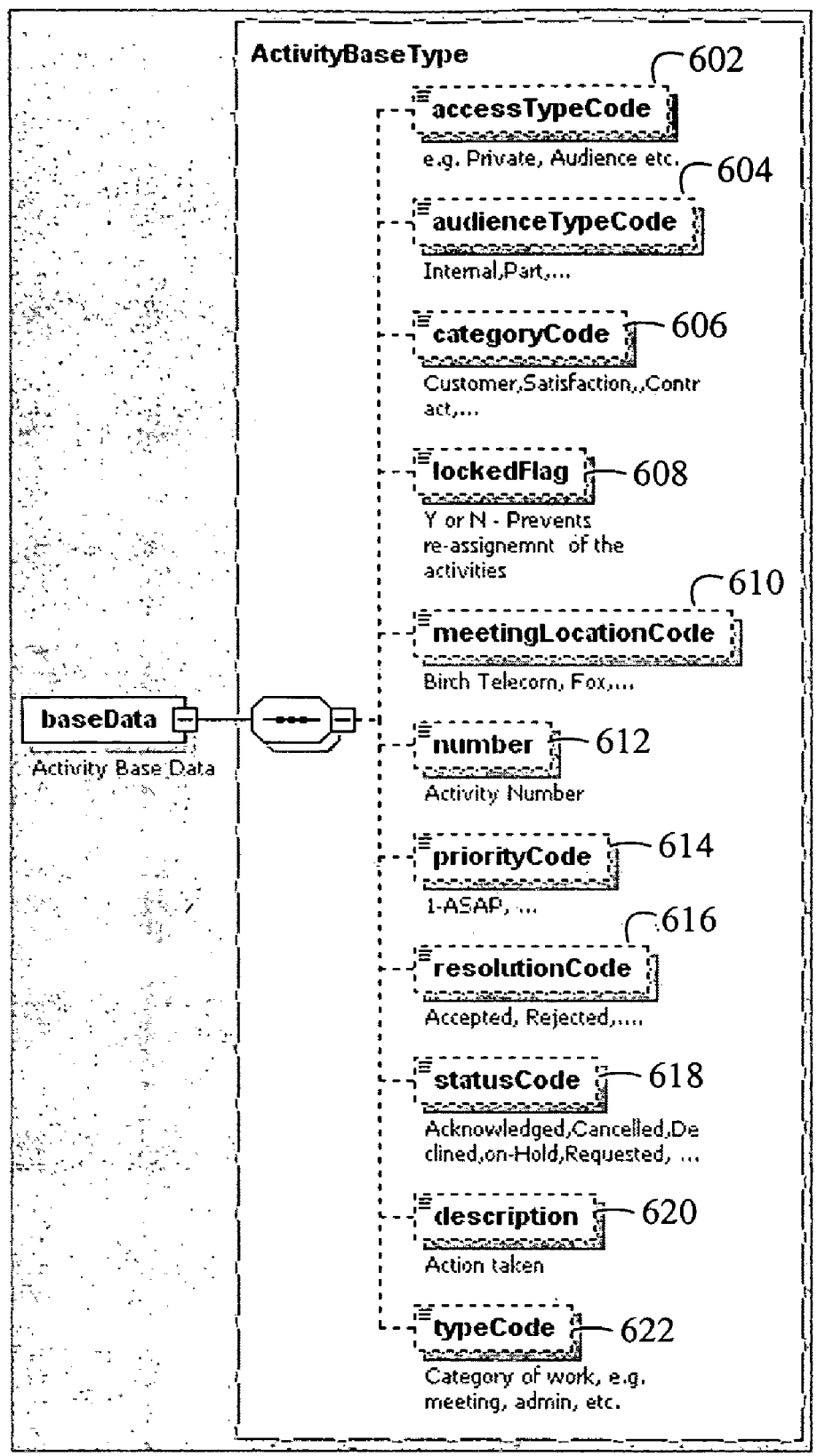

FIG. 6 illustrates the base data elements of the baseData class in one embodiment. The data elements of the baseData class include accessTypeCode 602, audienceTypeCode 604, categoryCode 606, lockedFlag 608, meetingLocationCode 610, number 612, priorityCode 614, resolutionCode 616, statusCode 618, description 620, and typeCode 622.

The accessTypeCode data element 602 specifies the access to the activity (e.g., private, public, etc.). The audienceTypeCode data element 604 specifies the type of audience having access to the activity (e.g., internal external, etc.). The categoryCode data element 606 specifies the category to which the activity belongs (e.g., customer oriented, defined by a contract, etc.). The lockedFlag data element 608 specifies whether reassignment of the activity is permitted. The meetingLocationCode data element 610 identifies the location of the activity (e.g., a meeting room if the activity is a meeting). The number data element 612 specifies the number assigned to the activity. The priorityCode data element 614 specifies the priority of the activity (e.g., urgent' low priority, etc.). The resolutionCode data element 616 specifies the resolution associated with the activity (e.g., whether the activity is rejected or accepted). The statusCode data element 618 specifies the status of the activity (e.g., cancelled, on hold, etc.). The description data element 620 specifies the action taken for the activity. The typeCode data element 622 specifies the type of the activity (e.g., a meeting, an administrative task, etc.).

Figure 7:
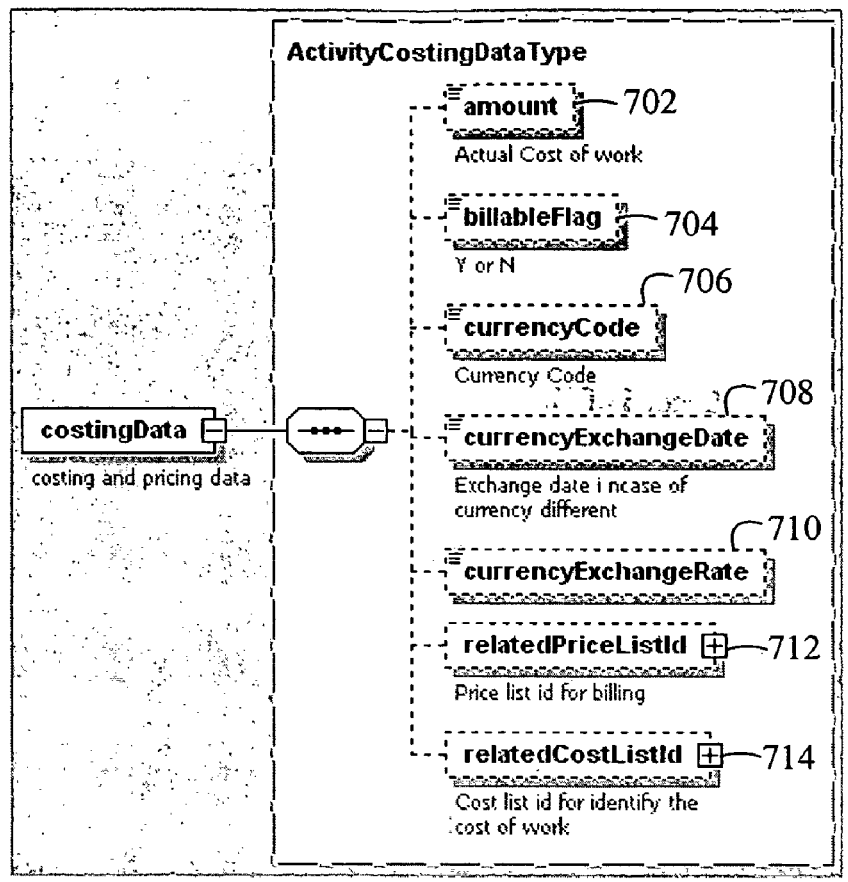

FIG. 7 illustrates the data elements of the costingData class in one embodiment. The data elements include amount 702, billableFlag 704, currencycode 706, currencyExchangeDate 708, currencyExchangeRate 710, relatedPriceListId 712 and relatedCostListId 714.

The amount data element 702 specifies the cost associated with the activity. The billableFlag data element 704 specifies whether the activity is billable. The currencyCode data element 706 specifies the currency used to covers the cost associated with the activity. The currencyExchangeDate data element 708 specifies the date for exchanging the currency in case of currency differences. The currencyExchangeRate data element 710 specifies the currency exchange rate in case of currency differences. The relatedPriceListId data element 712 contains a list of price IDs for billing the activity. The relatedCostListId data element 714 contains a list of cost IDs for costs associated with the activity.

Figure 8:
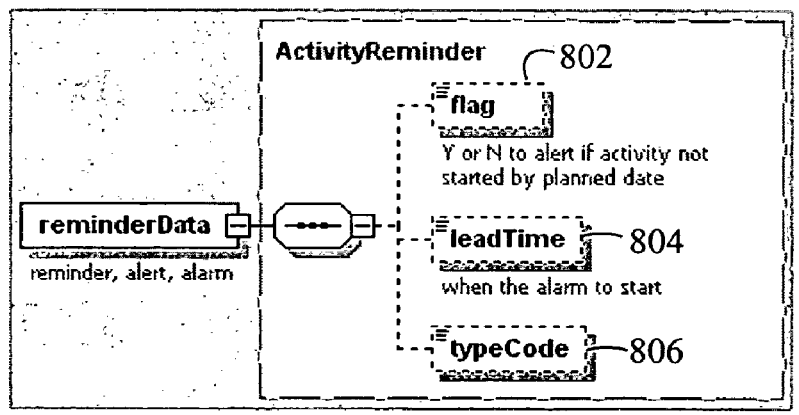

FIG. 8 illustrates the data elements of the reminderData class in one embodiment. The data elements include flag 802, leadTime 804 and typeCode 806.

The flag data element 802 specifies whether to provide a follow-up action (e.g., a reminder, an alert, an alarm, etc.) for the activity (e.g., if the activity is not started by a planned date). The leadTime data element 804 specifies when to start a follow-up action. The typeCode data element 806 specifies the type of a follow-up action.

Figure 9:
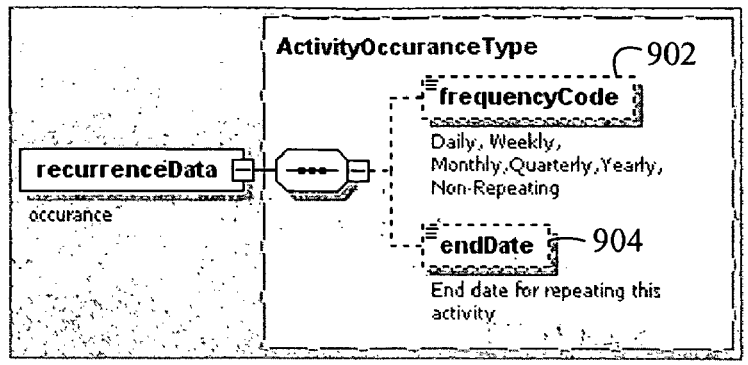

FIG. 9 illustrates the data elements of the recurrenceData class in one embodiment. The data elements include frequencyCode 902 and endDate 904.

The frequencyCode data element 902 specifies the frequency of the activity (e.g., daily, weekly, monthly, quarterly, yearly, non-repeating, etc.). The endDate data element 904 specifies the end date for repeating this activity.

Figure 10:
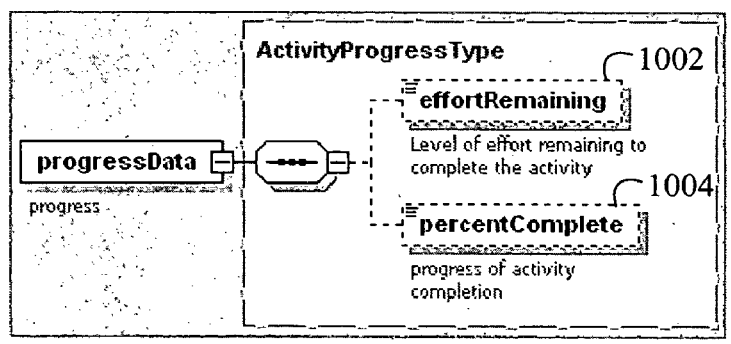

FIG. 10 illustrates the data elements of the progressData class in one embodiment. These data elements include effortRemaining 1002 and percentComplete 1004.

The effortRemaining data element 1002 specifies the level of effort remaining to complete the activity. The percentComplete data element 1004 specifies the percentage of the activity that has been completed.

Figure 11:
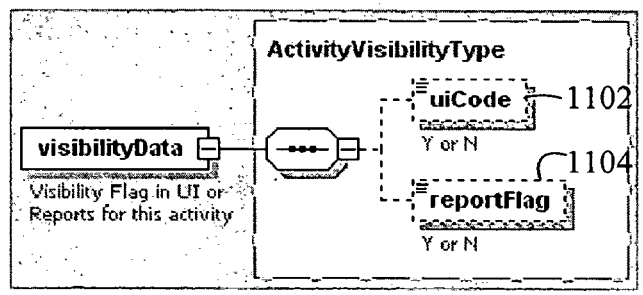

FIG. 11 illustrates the data elements of the visibilityData class in one embodiment. The data elements used in the visibilityData class include uiCode 1102 and reportFlag 1104.

The uiCode data element 1102 specifies whether data associated with the activity can be visible to the users in user interfaces. The reportFlag data element 1104 specifies whether data associated with the activity can be visible to the users in reports.

Figure 12:
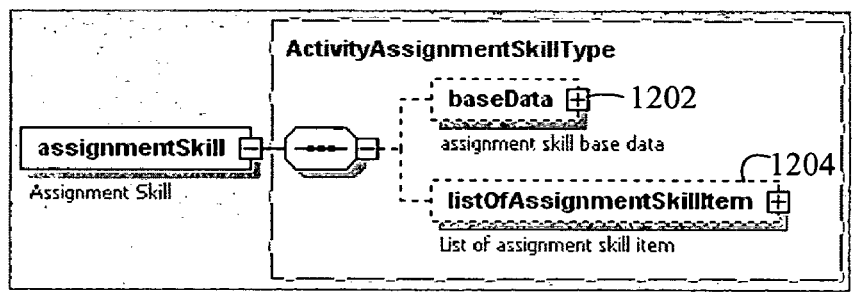

FIG. 12 illustrates the data elements of the assignmentSkill class in one embodiment. The data elements used in the assignmentSkill include baseData 1202 and listOfAssignmentSkillItem 1204. The baseData data element 1202 contains general information on the skills required for the assigned activity, as will be discussed in more detail below in conjunction with FIG. 13. The listOfAssignmentSkillItem data element 1204 contains a list of skills required for the assignment.

Figure 13:
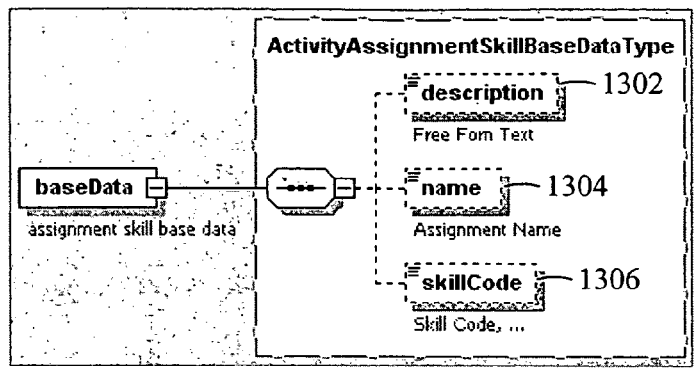

FIG. 13 illustrates the data elements of the baseData class in one embodiment. The data elements used in the baseData include description 1202, name 1204, and skillCode 1206. The description data element 1202 contains a free form description of the skill. The name data element 1204 provides the name of the skill. The skillCode data element 1206 specifies the code of the skill.

Figure 14:
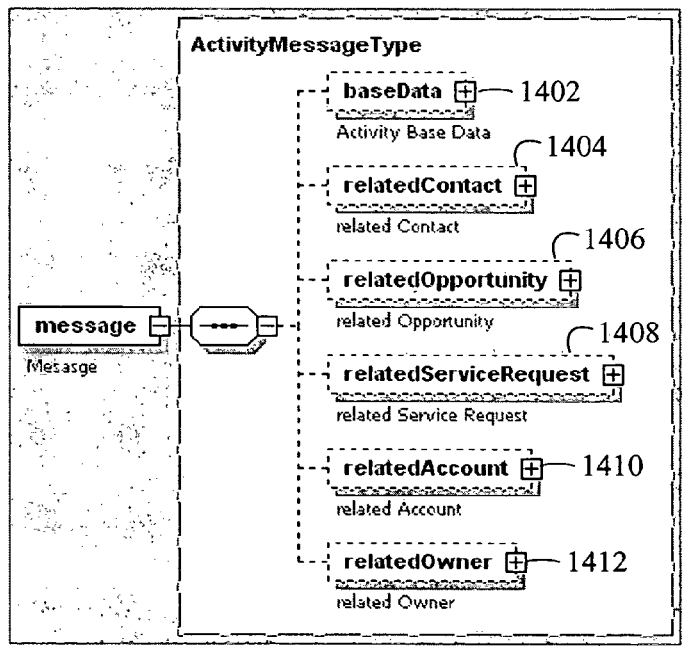

FIG. 14 illustrates the data elements of the message class in one embodiment. The data elements used in the message include baseData 1402, relatedContact 1404, relatedOpportunity 1406, relatedServiceRequest 1408, relatedAccount 1410 and relatedOwner 1412. The baseData data element 1402 includes general information on the message associated with the activity. The relatedContact data element 1404 identifies related contacts. The relatedOpportunity data element 1406 identifies a related opportunity. The relatedServiceRequest data element 1408 identifies a related service request. The relatedAccount data element 1410 identifies a related customer account. The relatedOwner data element 1412 identifies an employee responsible for the activity.

Figure 15:
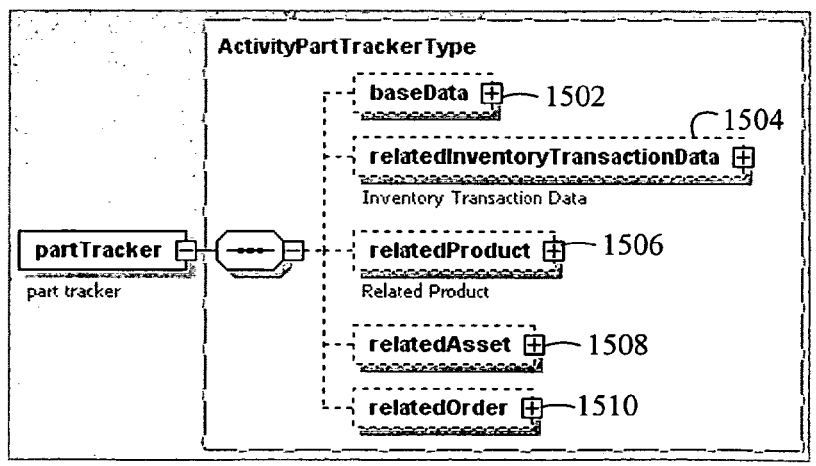

FIG. 15 illustrates the data elements of the partTracker class in one embodiment. The data elements used in the partTracker include baseData 1502, relatedInventoryTransactionData 1504, relatedProduct 1506, relatedAsset 1508, and relatedOrder 1510. The baseData data element 1502 includes general information on inventory movements associated with the activity. The relatedInventoryTransactionData data element 1504 identifies a related inventory transaction. The relatedProduct data element 1506 identifies a related product. The relatedAsset data element 1508 identifies related assets. The relatedOrder data element 1510 identifies a related order.

Figure 16:
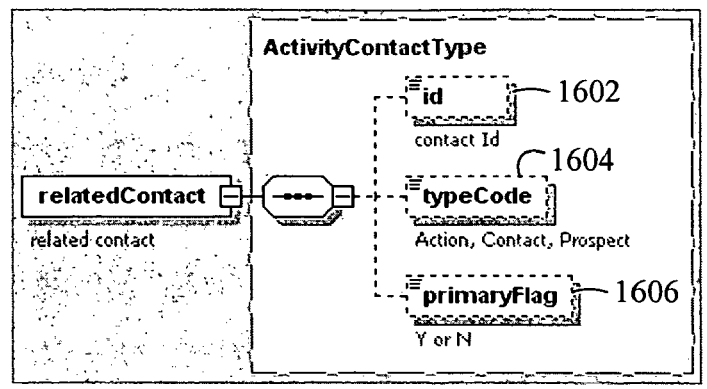

FIG. 16 illustrates the data elements of the relatedContact class in one embodiment. The relatedContact class references a party class representing a party. The data elements used in the relatedContact include id 1602, typeCode 1604 and primaryFlag 1606. The id data element 1602 specifies a contact id. The typeCode data element 1604 specifies the type of a contact (e.g., an existing contact, a prospect, etc.). The primaryFlag data element 1606 specifies whether it is a primary contact.

Figure 17:
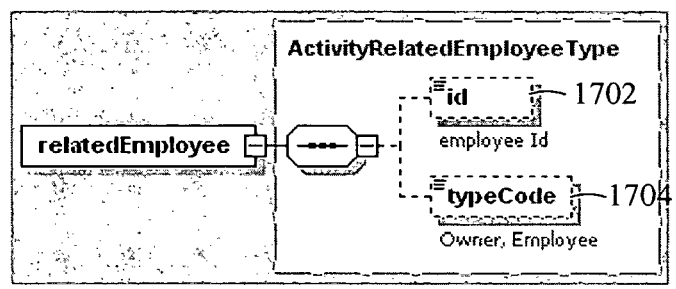

FIG. 17 illustrates the data elements of the relatedEmployee class in one embodiment. The data elements used in the relatedemployee include id 1702 and typeCode 1704. The id data element 1702 identifies an employee id. The typeCode data element 2604 specifies the type of the employee with respect to the activity (e.g., whether the employee is the owner of the activity).

Figure 18:
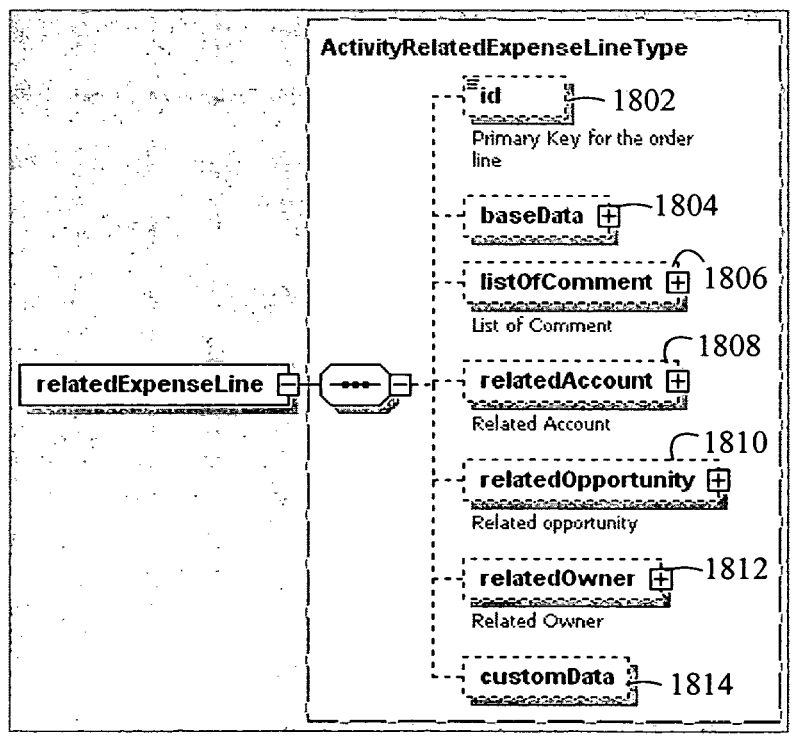

FIG. 18 illustrates the data elements of the relatedExpenseLine class in one embodiment. The relatedExpenseLine class references an expense class representing an expense. The data elements used in the relatedExpenseLine includes id 1802, baseData 1804, listOfComment 1806, relatedAccount 1808, relatedOpportunity 1810, relatedOwner 1812, and customData 1814. The id data element 1802 provides an expense line id. The baseData data element 1804 includes general information on expenses associated with the activity. The listOfComment data element 1806 includes a list of comments pertaining to the expenses. The relatedAccount data element 1808 identifies a related account. The relatedOpportunity data element 1810 identifies a related opportunity. The relatedOwner data element 1812 identifies a party responsible for the expense. The customData data element 1814 initially contains no data elements, but custom data elements can be added by defining data elements in the ActivityCustomDataType.

Figure 19:
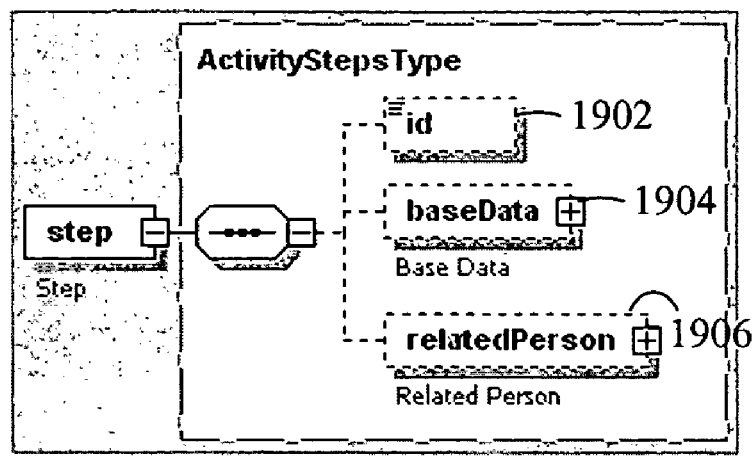

FIG. 19 illustrates the data elements of the Step class in one embodiment. The data elements used in the Step class include id 1902, baseData 1904, and relatedPerson 1906. The id data element 1902 provides the id of a step associated with fulfilling the activity. The baseData data element 1904 includes general information on the steps associated with fulfilling the activity. The relatedPerson data element 1906 identifies persons related to the steps associated with fulfilling the activity.

Figure 20:
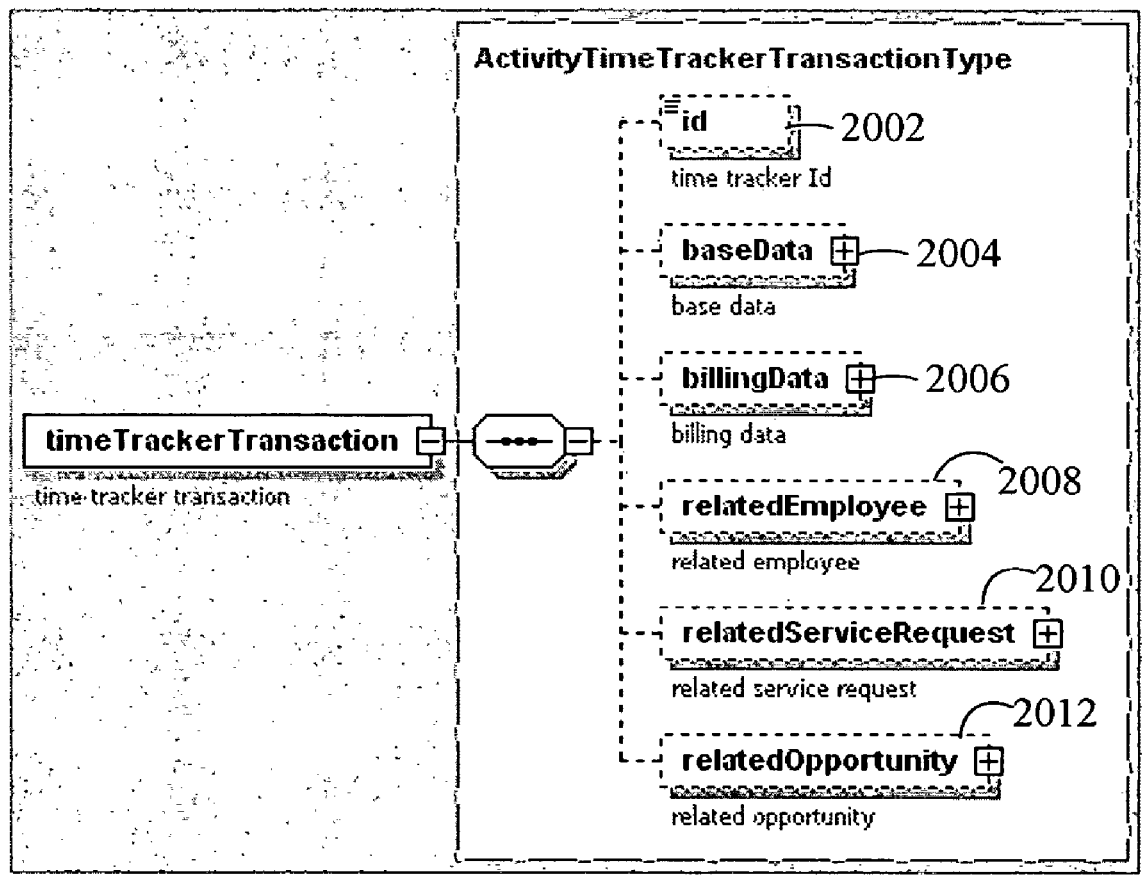

FIG. 20 illustrates the data elements of the timeTrackerTransaction class in one embodiment. The data elements used in the timeTrackerTransaction include id 2002, baseData 2004, and billingData 2006, relatedEmployee 2008, relatedServiceRequest 2010 and relatedOpportunity 2012. The id data element 3002 provides an id for the time taken for the activity. The baseData data element 2004 includes general information on the time taken for the activity. The billingData data element 2006 includes information on billing for the time taken for the activity. The relatedEmployee data element 2008 identifies a related employee. The relatedServiceRequest data element 2010 identifies a related service request. The relatedOpportunity data element 2012 identifies a related opportunity.

Figure 21:
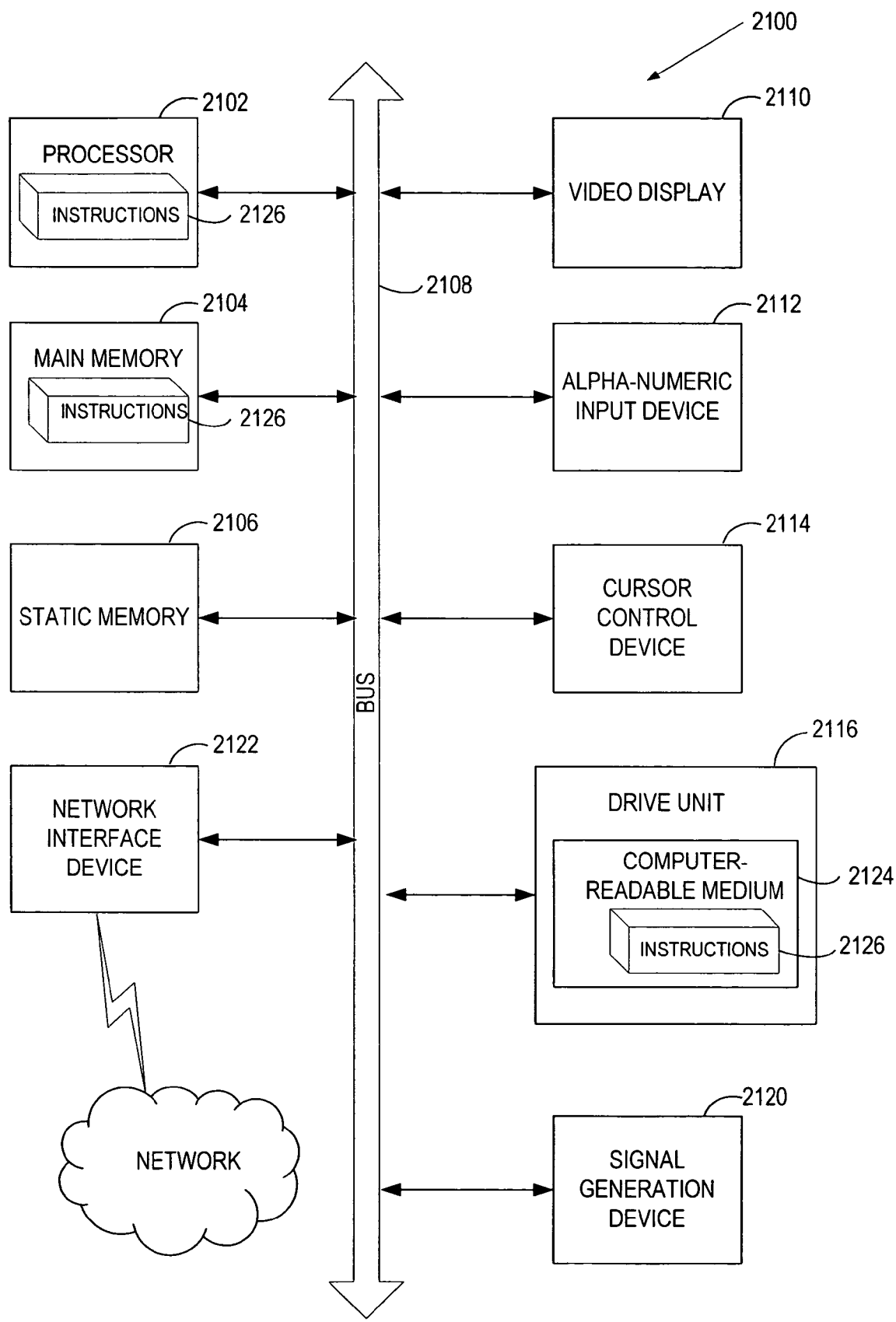
FIG. 21 is a block diagram of an exemplary computer system that may be used to perform one or more of the operations described herein.

FIG. 21 is a block diagram of an exemplary computer system 2100 (e.g., of the integration server 200 of FIG. 2) that may be used to perform one or more of the operations described herein. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 2100 includes a processor 2102, a main memory 2104 and a static memory 2106, which communicate with each other via a bus 2108. The computer system 2100 may further include a video display unit 2110 (e.g., a liquid crystal display (LCD) or a cathode ray tube (CRT)). The computer system 2100 also includes an alpha-numeric input device 2112 (e.g., a keyboard), a cursor control device 2114 (e.g., a mouse), a disk drive unit 2116, a signal generation device 2120 (e.g., a speaker) and a network interface device 2122.

The disk drive unit 2116 includes a computer-readable medium 2124 on which is stored a set of instructions (i.e., software) 2126 embodying any one, or all, of the methodologies described above. The software 2126 is also shown to reside, completely or at least partially, within the main memory 2104 and/or within the processor 2102. The software 2126 may further be transmitted or received via the network interface device 2122. For the purposes of this specification, the term "computer-readable medium" shall be taken to include any medium that is capable of storing or encoding a sequence of instructions for execution by the computer and that cause the computer to perform any one of the methodologies of the present invention. The term "computer-readable medium" shall accordingly be taken to included, but not be limited to, solid-state memories, optical and magnetic disks, and carrier wave signals.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A computer-readable storage medium comprising:
a first set of instructions, executable on a processor, configured to instantiate an activity class, wherein
the activity class comprises a plurality of data elements that are common to a plurality of activity types,
the activity class identifies a plurality of relationships of an activity with a plurality of entities related to the activity, wherein the activity types are common to a plurality of business processes,
the activity class further comprises a data element specifying a specific activity type for each entry in the activity class wherein the data element specifying the specific activity type is defined in a data definition schema for the activity class,
the activity class further comprises a custom data element defining one or more custom data fields for the activity class, wherein the one or more custom data fields of the activity class are specific to a source application, and wherein the custom data element is added to the activity class by:
a first subset of instructions, executable on the processor, configured to retrieve the data definition schema for the activity class, wherein the data definition schema includes the custom data element of a pre-defined type, and wherein the pre-defined type initially defines no data element,
a second subset of instructions, executable on the processor, configured to retrieve a custom data schema for a custom data of said pre-defined type,
a third subset of instructions, executable on the processor, configured to open said custom data schema and locating therein tags relating to said custom data of said pre-defined type,
a fourth subset of instructions, executable on the processor, configured to add said custom data element to a located tag, and
a fifth subset of instructions, executable on the processor, configured to close said custom data schema with said custom data element added thereto, and
the activity class further comprises a step sub-class comprising a data element specifying an identification of a step associated with fulfilling the activity, information about the step associated with fulfilling the activity, and an identification of a person related to the identified step;
a second set of instructions, executable on the processor, configured to initialize data elements of the instantiated activity class;
a third set of instructions, executable on the processor, configured to transform data received from the source application into a common format of the activity class, wherein the source application is one of a first customer relationship management (CRM) application or a first partner relationship management (PRM) application;
a fourth set of instructions, executable on the processor, configured to transform the data from the common format into a target format of a target application, wherein the target application is one of a second CRM application or a second PRM application; and
a fifth set of instructions, executable on the processor, configured to send the data in the target format to the target application.

2. The computer-readable storage medium of claim 1 further comprising:
a sixth set of instructions, executable on the processor, configured to select two or more activity types from a group consisting of a service request activity, an opportunity activity, and a call tracking activity.

3. The computer-readable storage medium of claim 1 further comprising:
a sixth set of instructions, executable on the processor, configured to select the plurality of entities from a group consisting of follow-up actions, related accounts, a related parent activity, related installed products, a related opportunity, a related service request, related contacts, and related employees.

4. The computer-readable storage medium of claim 1 wherein the activity class is configured for use by an application handling activity data.

5. The computer-readable storage medium of claim 4 wherein said application is not industry specific.

6. The computer-readable storage medium of claim 1 wherein a definition of the activity class is represented as an XML schema.

7. The computer-readable storage medium of claim 1 wherein the activity class further comprises:
a visibility sub-class comprising a first data element specifying whether data associated with the activity can be displayed in a user interface and a second data element specifying whether data associated with the activity can be displayed in a report.

8. The computer-readable storage medium of claim 1 wherein the activity class further comprises:
an assignment skill sub-class comprising a first data element specifying one or more skills required to perform the activity and a second data element describing each of the one or more skills required to perform the activity.

9. The computer-readable storage medium of claim 1 wherein the activity class further comprises:
a recurrence sub-class comprising a first data element specifying a frequency of repeating the activity and a second data element specifying an end date for repeating the activity.

10. A method for data transformation, the method comprising:
receiving activity data from a source application, wherein the source application is one of a first customer relationship management (CRM) application or a first partner relationship management (PRM) application;
transforming the activity data into a common format provided by an activity class; and
transforming the activity data from the common format into a target format of a target application, wherein
the target application is one of a second CRM application or a second PRM application,
the activity class includes a plurality of data elements common to a plurality of activity types and identifies a plurality of relationships of an activity with a plurality of entities related to the activity,
the activity class further comprises a data element specifying a specific activity type for each entry in the activity class wherein the data element specifying the specific activity type is defined in a data definition schema for the activity class,
the activity class further comprises a custom data element defining one or more custom data fields for the activity class, wherein the one or more custom data fields of the activity class are specific to the source application, and wherein the custom data element is added to the activity class by:
retrieving the data definition schema for the activity class, wherein the data definition schema includes the custom data element of a pre-defined type, and wherein the pre-defined type initially defines no data element,
retrieving a custom data schema for a custom data of said pre-defined type,
opening said custom data schema and locating therein tags relating to said custom data of said pre-defined type,
adding said custom data element to a located tag, and closing said custom data schema with said custom data element added thereto, and
the activity class further comprises a step sub-class comprising a data element specifying an identification of a step associated with fulfilling the activity, information about the step associated with fulfilling the activity, and an identification of a person related to the identified step.

11. The method of claim 10 wherein the plurality of activity types comprises two or more activity types selected from the group consisting of a service request activity, an opportunity activity, and a call tracking activity.

12. The method of claim 10 wherein the plurality of entities related to the activity is selected from the group consisting of follow-up actions, related accounts, a related parent activity, related installed products, a related opportunity, a related service request, related contacts, and related employees.

13. The method of claim 10 wherein:
each of the source application and target application is any application handling activity data, independent of an industry.

14. A computer-readable storage medium having executable instructions to cause a machine to perform a method comprising:
defining an activity class including a plurality of data elements that are common to a plurality of activity types, the activity class identifying a plurality of relationships of an activity with a plurality of entities related to the activity, wherein
the activity types are common to a plurality of business processes,
the activity class further comprises a data element specifying a specific activity type for each entry in the activity class wherein the data element specifying the specific activity type is defined in a data definition schema for the activity class,
the activity class further comprises a custom data element defining one or more custom data fields for the activity class, wherein the one or more custom data fields of the activity class are specific to a source application, and wherein the custom data element is added to the activity class by:
retrieving the data definition schema for the activity class, wherein the data definition schema includes the custom data element of a pre-defined type, and wherein the pre-defined type initially defines no data element,
retrieving a custom data schema for a custom data of said pre- defined type,
opening said custom data schema and locating therein tags relating to said custom data of said pre-defined type,
adding said custom data element to a located tag, and closing said custom data schema with said custom data element added thereto, and
the activity class further comprises a step sub-class comprising a data element specifying an identification of a step associated with fulfilling the activity, information about the step associated with fulfilling the activity, and an identification of a person related to the identified step;
transforming data received from the source application into a common format of the activity class, wherein the source application is one of a first customer relationship management (CRM) application or a first partner relationship management (PRM) application;
transforming the data from the common format into a target format of a target application, wherein the target application is one of a second CRM application or a second PRM application; and
sending the data in the target format to the target application.

15. The computer-readable storage medium of claim 14 wherein the plurality of activity types comprises two or more activity types selected from the group consisting of a service request activity, an opportunity activity, and a call tracking activity.

16. The computer-readable storage medium of claim 14 wherein the plurality of entities related to the activity is selected from the group consisting of follow-up actions, related accounts, a related parent activity, related installed products, a related opportunity, a related service request, related contacts, and related employees.

17. A computer-readable storage medium having executable instructions to cause a machine to perform a method comprising:
    receiving activity data from a source application, wherein the source application is one of a first customer relationship management (CRM) application or a first partner relationship management (PRM) application;
    transforming the activity data into a common format provided by an activity class; and
    transforming the activity data from the common format into a target format of a target application, wherein
        the target application is one of a second CRM application or a second PRM application,
        the activity class includes a plurality of data elements common to a plurality of activity types and identifies a plurality of relationships of an activity with a plurality of entities related to the activity,
        the activity class further comprises a data element specifying a specific activity type for each entry in the activity class wherein the data element specifying the specific activity type is defined in a data definition schema for the activity class,
        the activity class further comprises a custom data element defining one or more custom data fields for the activity class, wherein the one or more custom data fields of the activity class are specific to the source application, and wherein the custom data element is added to the activity class by:
            retrieving the data definition schema for the activity class, wherein the data definition schema includes the custom data element of a pre-defined type, and wherein the pre-defined type initially defines no data element,
            retrieving a custom data schema for a custom data of said pre-defined type,
            opening said custom data schema and locating therein tags relating to said custom data of said pre-defined type,
            adding said custom data element to a located tag, and
            closing said custom data schema with said custom data element added thereto, and
        the activity class further comprises a step sub-class comprising a data element specifying an identification of a step associated with fulfilling the activity, information about the step associated with fulfilling the activity, and an identification of a person related to the identified step.

18. The computer-readable storage medium of claim 17 wherein the plurality of activity types comprises two or more activity types selected from the group consisting of a service request activity, an opportunity activity, and a call tracking activity.

19. The computer-readable storage medium of claim 18 wherein the plurality of entities related to the activity is selected from the group consisting of follow-up actions, related accounts, a related parent activity, related installed products, a related opportunity, a related service request, related contacts, and related employees.

20. A system comprising:
    a memory configured to store a set of instructions; and
    a processor coupled to the memory, the processor configured to execute said set of instructions that cause the processor to perform the following:
        define an activity class including a plurality of data elements common to a plurality of activity types, the activity class identifying a plurality of relationships of an activity with a plurality of entities related to the activity, wherein
            the activity types are common to a plurality of business processes,
            the activity class further comprises a data element specifying a specific activity type for each entry in the activity class wherein the data element specifying the specific activity type is defined in a data definition schema for the activity class,
            the activity class further comprises a custom data element defining one or more custom data fields for the activity class, wherein the one or more custom data fields of the activity class are specific to a source application, and wherein the custom data element is added to the activity class by:
                retrieving the data definition schema for the activity class, wherein the data definition schema includes the custom data element of a pre-defined type, and wherein the pre-defined type initially defines no data element,
                retrieving a custom data schema for a custom data of said pre-defined type,
                opening said custom data schema and locating therein tags relating to said custom data of said pre-defined type,
                adding said custom data element to a located tag, and
                closing said custom data schema with said custom data element added thereto, and
            the activity class further comprises a step sub-class comprising a data element specifying an identification of a step associated with fulfilling the activity, information about the step associated with fulfilling the activity, and an identification of a person related to the identified step,
        transform data received from the source application into a common format of the activity class, wherein the source application is one of a first customer relationship management (CRM) application or a first partner relationship management (PRM) application,
        transform the data from the common format into a target format of a target application, wherein the target application is one of a second CRM application or a second PRM application, and
        send the data in the target format to the target application.

21. A system comprising:
    a memory configured to store a set of instructions; and
    at least one processor coupled to the memory, the processor executing said set of instructions which cause the processor to
        receive activity data from a source application, wherein the source application is one of a first customer relationship management (CRM) application or a first partner relationship management (PRM) application,
        transform the activity data into a common format provided by an activity class, and
        transform the activity data from the common format into a target format of a target application, wherein the target application is one of a second CRM application or a second PRM application, and wherein
            the activity class includes a plurality of data elements common to a plurality of activity types activity and identifies a plurality of relationships of an activity with a plurality of entities related to the activity, the activity class further comprises a data element specifying a specific activity type for each entry in the activity class wherein the data element specifying the specific activity type is defined in a data definition schema for the activity class, the activity class further comprises a custom data element defining one or more custom data fields for the activity class, wherein the one or more custom data fields of the activity class are specific to the source application, and wherein the custom data element is added to the activity class by:

means for retrieving the data definition schema for the activity class, wherein the data definition schema includes the custom data element of a pre-defined type, and wherein the pre-defined type initially defines no data element, retrieving a custom data schema for a custom data of said pre-defined type, opening said custom data schema and locating therein tags relating to said custom data of said pre-defined type, adding said custom data element to a located tag, and closing said custom data schema with said custom data element added thereto, and the activity class further comprises a step sub-class comprising a data element specifying an identification of a step associated with fulfilling the activity, information about the step associated with fulfilling the activity, and an identification of a person related to the identified step.

22. An apparatus comprising:

a memory;

means for defining an activity class including a plurality of data elements that are common to a plurality of activity types, the activity class identifying a plurality of relationships of an activity with a plurality of entities related to the activity, wherein the activity types are common to a plurality of business processes, the activity class further comprises a data element specifying a specific activity type for each entry in the activity class wherein the data element specifying the specific activity type is defined in a data definition schema for the activity class, the activity class further comprises a custom data element defining one or more custom data fields for the activity class, wherein the one or more custom data fields of the activity class are specific to a source application, and wherein the custom data element is added to the activity class by:

means for retrieving the data definition schema for the activity class, wherein the data definition schema includes the custom data element of a pre-defined type, and wherein the pre-defined type initially defines no data element, means for retrieving a custom data schema for a custom data of said pre-defined type, means for opening said custom data schema and locating therein tags relating to said custom data of said pre-defined type, means for adding said custom data element to a located tag, and means for closing said custom data schema with said custom data element added thereto, and the activity class further comprises a step sub-class comprising a data element specifying an identification of a step associated with fulfilling the activity, information about the step associated with fulfilling the activity, and an identification of a person related to the identified step;

means for storing the activity class in the memory;

means for transforming data received from the source application into a common format of the activity class, wherein the source application is one of a first customer relationship management (CRM) application or a first partner relationship management (PRM) application;

means for transforming the data from the common format into a target format of a target application, wherein the target application is one of a second CRM application or a second PRM application; and means for sending the data in the target format to the target application.

23. An apparatus for data transformation, the apparatus comprising:

means for receiving activity data from a source application, wherein the source application is one of a first customer relationship management (CRM) application or a first partner relationship management (PRM) application;

means for transforming the activity data into a common format provided by an activity class; and means for transforming the activity data from the common format into a target format of a target application, wherein the target application is one of a second CRM application or a second PRM application, and wherein the activity class includes a plurality of data elements common to a plurality of activity types activity and identifies a plurality of relationships of an activity with a plurality of entities related to the activity, and the activity class further comprises a data element specifying a specific activity type for each entry in the activity class wherein the data element specifying the specific activity type is defined in a data definition schema for the activity class, the activity class further comprises a custom data element defining one or more custom data fields for the activity class, wherein the one or more custom data fields of the activity class are specific to the source application, and wherein the custom data element is added to the activity class by:

means for retrieving the data definition schema for the activity class, wherein the data definition schema includes the custom data element of a pre-defined type, and wherein the pre-defined type initially defines no data element, means for retrieving a custom data schema for a custom data of said pre-defined type, means for opening said custom data schema and locating therein tags relating to said custom data of said pre-defined type, means for adding said custom data element to a located tag, and means for closing said custom data schema with said custom data element added thereto, and the activity class further comprises a step sub-class comprising a data element specifying an identification of a step associated with fulfilling the activity, information about the step associated with fulfilling the activity, and an identification of a person related to the identified step.

* * * * *

UNITED STATES PATENT AND TRADEMARK OFFICE
CERTIFICATE OF CORRECTION

| | |
|---|---|
| PATENT NO. | : 7,617,239 B2 |
| APPLICATION NO. | : 10/851312 |
| DATED | : November 10, 2009 |
| INVENTOR(S) | : Pascal Laik et al. |

Page 1 of 1

It is certified that error appears in the above-identified patent and that said Letters Patent is hereby corrected as shown below:

On the Title page, item [56]: on page 2, in column 2, under "Other Publications", line 7, delete "XP3-002325475." and insert -- XP-002325475. --, therefor.

On sheet 6 of 12, in Figure 6, Ref. Numeral 608, line 3, delete "re-assignemnt" and insert -- re-assignment --, therefor.

On sheet 7 of 12, in Figure 6, Ref. Numeral 708, line 2, delete "i ncase" and insert -- in case --, therefor.

In column 8, line 63, delete "currencycode 706," and insert -- currencyCode 706, --, therefor.

In column 8, line 64, delete "relatedPriceListld 712" and insert -- relatedPriceListId 712 --, therefor.

In column 10, line 25, delete "relatedemployee" and insert -- relatedEmployee --, therefor.

In column 14, line 35, in claim 14, delete "pre- defined" and insert -- pre-defined --, therefor.

In column 16, line 65, in claim 21, after "plurality of activity types" delete "activity".

In column 18, line 31, in claim 23, after "plurality of activity types" delete "activity".

Signed and Sealed this

Third Day of August, 2010

David J. Kappos
*Director of the United States Patent and Trademark Office*